United States Patent Office

2,829,130
Patented Apr. 1, 1958

2,829,130

EPOXY RESIN

Frank P. Greenspan, Buffalo, and Rupert E. Light, Jr., Kenmore, N. Y., assignors to Food Machinery and Chemical Corporation, San Jose, Calif.

No Drawing. Application November 17, 1955
Serial No. 547,570

9 Claims. (Cl. 260—82.1)

This invention pertains to a process of making synthetic resins and more particularly to a process of making synthetic resins useful for castings and coatings, using butadiene copolymers as the raw material.

Because of its ready availability and its physical properties, butadiene copolymers are a potentially useful raw material for the production of thermosetting synthetic resins. Although it is possible to use butadiene copolymers directly for making coatings, these coatings are not entirely satisfactory, usually showing lack of adhesion and lack of toughness. Particularly difficult is the production of useful castings from butadiene copolymers.

It has now been found, in accordance with the present invention, that treatment of butadiene copolymers with specific oxidizing agents, followed by treating the oxidation product with acidic reagents, permits the production of resins which will give excellent castings and coatings which are tough, flexible and well adherent.

The butadiene copolymers comprise the conjugated dienes, for example butadiene and isoprene, as well as alkyl substitution products thereof, copolymerized with a substituted ethylene monomer containing the

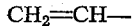

group, for example styrene and acrylonitrile, among others.

The process of this invention comprises a series of steps which will be more fully discussed later on. In principle, butadiene copolymers are treated in this process first with an epoxidizing reagent, such as an organic peracid. The resulting oxidized product is then treated with a dicarboxylic acid or the anhydride of such an acid. This last treatment is carried out under conditions which are directly suitable for the production of castings or coatings. If it be desired to produce a casting, the epoxidation product resulting from treating butadiene copolymers with an organic peracid is mixed with a suitable dicarboxylic acid or anhydride thereof and the mixture then poured into a mold. Upon heating, the mixture will then set to a hard, tough, and usually light-colored cast resin. If it be desired to form a coating, the oxidation product obtained by treating butadiene copolymers with an organic peracid is mixed in solvent solution with a suitable dicarboxylic acid or anhydride thereof and this solvent mixture then applied to the surface to be coated and heated. Upon evaporation of the solvent, a tough, flexible and strongly adherent resin coating is then obtained. The resins of the present invention are of the thermosetting type.

Butadiene copolymers generally can be used as the raw material in the process of this invention. Production of useful oxidized butadiene copolymers in the sense of this invention requires a starting material of a certain minimum chain length, i. e., degree of polymerization. No theoretical upper limit exists for the chain length of the unsaturated starting material to be oxidized in accordance with this invention. However, there are certain practical considerations which impose a limit on the degree of polymerization of the starting material. Because the oxidation reaction has to be carried out in the liquid phase, the starting material must either be a liquid or must be soluble in a suitable reaction medium. Many highly polymerized compounds are solids of little or no solubility in otherwise useful solvents and in this respect a practical upper limit is imposed on the degree of polymerization of the starting material. In other words, the practical requirement imposed by the need of working in the liquid phase limits the choice of starting material. However, the degree of polymerization of the starting material will also have to be considered in connection with the properties desired in the oxidized product. A highly polymerized starting material will produce an oxidized product of somewhat different properties than would be obtained by the use of a starting material of a lower degree of polymerization.

The oxidation of the butadiene copolymer is carried out in accordance with this invention by treating it with an organic peracid. Although organic peracids can be used generally, it is preferred to employ the lower aliphatic peracids such as peracetic acid or performic acid. The oxidation reaction may be carried out using a preformed peracid or the peracid may be formed from its constituents during the oxidation reaction and in the reaction medium.

When oxidizing the butadiene copolymer with the organic peracid, stoichiometric amounts of the peracid may be used or amounts below that theoretically required completely to oxidize the double bonds present in the butadiene copolymer. In the following examples, butadiene copolymers treated with the stoichiometric amount of peracid will be designated as "100% oxidized." Butadiene copolymers oxidized with reduced amounts of peracid will be designated by a percent figure to indicate what might be termed the degree of oxidation in terms of the fraction of the theoretical amount of peracid used. The reactivity and resin-forming properties of the oxidized butadiene copolymer will obviously vary with its degree of oxidation. Generally speaking, a 100% oxidized butadiene copolymer will be more reactive and will more readily form a casting or coating resin than butadiene copolymer oxidized to a lesser extent. At the same time, properties of the finished casting or coating will also be influenced to an extent by the degree of the oxidation of the butadiene copolymer.

As indicated above, the oxidized butadiene copolymers are subsequently treated with a saturated or unsaturated dicarboxylic acid or anhydride. Examples of acids which may be used in the process of this invention are: adipic, fumaric, maleic, malic, oxalic, sebacic, tartaric and others. Examples of anhydrides which may be used are: maleic, succinic, phthalic, tetrahydrophthalic and others. Certain limitations on the choice of acid or anhydride are, however, imposed by the practical process requirements. If casting resins are to be reduced, the oxidized butadiene copolymer has to be mixed with the acid or anhydride before casting and heating. To permit proper mixing, the two main reactants—the oxidized butadiene copolymer and the acid or anhydride—should be liquid. Therefore, in the case of casting resins, the acid or anhydride should be a liquid at ordinary temperature or must have a relatively low melting point to permit mixing at room temperature or somewhat elevated temperature. In the case of coating resins, a solvent is invariably used from which the coating is then obtained by evaporation. In this case, a solvent is chosen in which the acid or anhydride used is soluble and from which the coating is made.

The amount of dicarboxylic acid or anhydride to be used for treating oxidized butadiene copolymer depends on the degree of oxidation of the butadiene copolymer and the particular acid or anhydride used. Generally speaking, one equivalent weight of oxidized butadiene copolymer, that is the weight of butadiene copolymer containing 16 grams of oxirane oxygen, is treated with one equivalent weight of the dicarboxylic acids, that is an amount of acid by weight corresponding to one-half of the molecular weight of the dibasic acid. In the case of anhydrides this amount is calculated as it would be for the corresponding acid. The amount of acid or anhydride calculated in this way represents the theoretical amount for complete reaction with one equivalent weight of the oxidized butadiene copolymer. For example, if a sample of oxidized butadiene copolymer is found by analysis to contain 6.6 gram of oxirane oxygen per 100 gram of product, the equivalent weight of the product will then be $$\frac{100 \times 16}{6.6}$$

or 242 gram. If this product is to be treated with, e. g. adipic acid, whose equivalent weight is one-half of its molecular weight or 73 grams, then the theoretical amount of adipic acid to be used with this particular oxidized butadiene copolymer would be $$\frac{73}{242} \text{ g.}$$

or 0.301 gram of acid per gram of this particular oxidized butadiene copolymer.

In accordance with this invention, from 10 to 200% of the calculated theoretical amount of acid or anhydride may be used in the production of the new casting or coating resins of this invention. Generally the higher percentage range finds use with anhydrides.

In the following examples, additions of sodium acetate to the peracetic acid solution are made only for the purpose of pH adjustment and additions of dipicolinic acid for the purpose of stabilizing the peracid.

EXAMPLE 1

Into a 250 ml. 3-necked flask equipped with stirrer, thermometer, dropping funnel and cooling system, were placed 10.6 g. of a liquid sodium polymerized copolymer of 70 parts butadiene and 30 parts of styrene, dissolved in 60 g. of toluene. To this were slowly added 36.5 g. of 40% peracetic acid, that is, a 50% excess over the amount theoretically required to oxidize all double bonds in the polymer, which amount of peracetic acid also contained 1.6 g. of sodium acetate and 0.1 g. of dipicolinic acid. The reaction mixture was maintained for about 10 minutes at about 25° C. for an additional 65 minutes at about 50° C. The mixture was then cooled to room temperature, washed with water, washed with a saturated solution of sodium chloride and finally washed with a sodium chloride solution containing potassium hydroxide until neutral. The product was filtered off and excess solvent removed under reduced pressure. The product was finally dried in a vacuum desiccator. Analysis showed the end product contained 7.16% oxirane oxygen.

To a toluene solution of the oxidized butadiene copolymer containing 60.5% of the product by weight was then added an amount of maleic anhydride corresponding to 0.195 g. per gram of oxidized butadiene copolymer in solution. This mixture was then spread on a glass plate and the coated glass plate was baked for 2 hours at 150° C. The resin was thermosetting as the coating obtained after baking was extremely hard and tough and showed very good adhesion to the glass.

EXAMPLE 2

Another sample of the same copolymer used in Example 1 was oxidized as described in Example 1 and a 60.5% by weight solution in toluene was prepared therefrom. To this solution was then added an amount of maleic acid corresponding to 0.330 g. per gram of oxidized butadiene copolymer in solution. This mixture was then spread on a glass plate and the coated glass plate baked for 2 hours at 150° C. The resin was thermosetting as the coating obtained after baking was extremely hard and tough and showed very good adhesion to the glass.

EXAMPLE 3

400 g. of a liquid copoylmer of 50 parts of butadiene and 50 parts of styrene were dissolved in 400 ml. of toluene. To this solution was slowly added 508 g. of 40% peracetic acid containing 22 g. of sodium acetate and 1 g. of dipicolinic acid. This amount of peracetic acid corresponds to a 10% excess over the amount theoretically required to oxidize all double bonds in the polymer. The mixture was maintained for 60 minutes at about 26° C. and the oxidized product recovered as described in Example 1. Analysis showed that it contained 4.33% oxirane oxygen.

To a toluene solution of the product was then added an amount of 1,2,3-propanetricarboxylic acid corresponding to 0.163 g. per gram of oxidized butadiene copolymer in solution. This mixture was then evenly spread on a glass plate and the coated plate baked for 1 hour at 180° C. The resin was thermosetting as the coating obtained after baking was hard and adhered to the glass plate.

EXAMPLE 4

100 g. of the same butadiene styrene copolymer described in Example 1 were oxidized in toluene solution with 172.5 g. of 40% peracetic acid containing 7.4 g. of sodium acetate and 0.39 g. of dipicolinic acid. This amount of peracetic acid corresponds to a slight excess over the amount theoretically required to oxidize all double bonds in the polymer. The mixture was kept for 15 minutes at about 22° C. and for an additional 100 minutes at about 30° C. The product was recovered as described in Example 1 and contained 6.3% oxirane oxygen.

To a toluene solution of this product was then added an amount of tetrahydrophthalic anhydride corresponding to 0.478g. per gram of oxidized butadiene copolymer in solution. This mixture was then spread on a glass plate and the coated glass plate baked for 20 minutes at 120° C. and 2 hours at 150° C. The resin was thermosetting as the coating obtained after baking was very hard and very tough and adhered to the glass plate.

EXAMPLE 5

1000 g. of a copolymer of 70 parts of butadiene and 30 parts of styrene were dissolved in 1000 g. of toluene. To this mixture was added 160 g. of glacial acetic acid, 270 g. of a nuclear sulfonic type cation exchange resin and 382 g. of hydrogen peroxide 50%. Amount of hydrogen peroxide used corresponded to approximately 50% of the stoichiometric amount required to fully oxidize the copolymer. The hydrogen peroxide was added slowly while the mixture was kept at 60 to 65° C. and the reaction contained for a total of 2½ hours. The product was recovered as described in Example 1 and contained 5.5% oxirane oxygen.

The product was divided into 5 parts, to each of which was added the proper amount of dicarboxylic acid or anhydride. This was done at elevated temperature to facilitate mixing. The molten mixtures were then poured into molds and heated for 4 hours at 140° C. After cooling and removal from the mold, clear, hard and tough castings were obtained.

The various procedures are presented in the following:

Table 1

| Acid or anhydride | Gram per gram of resin | Properties of the casting |
|---|---|---|
| Maleic anhydride | 0.17 | Hard and tough. |
| Azelaic acid | 0.161 | Medium hard and tough. |
| Tetrahydrophthalic anhydride | 0.263 | Very hard and tough. |
| 1:1 mixture of maleic anhydride and azelaic acid | 0.164 | Do. |
| 1:1 mixture of maleic anhydride and hexahydrophthalic anhydride | 0.214 | Do. |

EXAMPLE 6

Another sample of the same butadiene-styrene copolymer used in Example 5 was oxidized in the manner described in Example 5, but the amount of hydrogen peroxide 50% used corresponded only to 10% of the stoichiometric amount required to fully oxidize the butadiene copolymer. Analysis of the product obtained indicated a content of 0.75% oxirane oxygen.

The product was warmed up to about 120° C. to increase its fluidity and to facilitate mixing in of a 1:1 mixture of maleic anhydride and azelaic acid in an amount corresponding to 0.023 g. of this mixture per gram of resin. The molten mixture was then poured into a mold and heated for 4 hours at 140° C. After cooling and removal from the mold, a fairly tough rubbery casting was obtained.

EXAMPLE 7

This example describes preparation of a coating resin from a copolymer of 20 parts of isoprene and 80 parts of styrene, oxidized as described in Example 1, but with only 86% of the stoichiometric amount of peracetic acid required to fully oxidize the polymer. The product was recovered as described in Example 1 and found to contain 2.44% oxirane oxygen. To a benzene solution of the product was added phthalic anhydride in an amount corresponding to 0.113 g. per gram of resin. This mixture was then spread on a glass plate and the coated plate baked for 4 hours at about 110° C. The resin coating obtained was hard and showed good adhesion to the glass plate.

EXAMPLE 8

300 g. of the same butadiene-styrene copolymer as used in Example 1 was dissolved in 450 g. of toluene and 45 g. of 98% formic acid was added to it. To this was added, over a period of 45 minutes and at a temperature of 60 to 65° C., 120.6 g. of 50% hydrogen peroxide corresponding to 50% of the stoichiometric amount required to fully oxidize the copolymer. The mixture was then maintained for an additional 4 hours at 60 to 65° C. The product was recovered as described in Example 1 and found to contain 6.0% oxirane oxygen.

The product was then heated to elevated temperature to facilitate mixing with an amount of tetrahydrophthalic anhydride corresponding to 0.316 g. per gram of resin and the mixture poured into a mold and heated for 4 hours at 140° C. After cooling and removal from the mold, a hard and tough casting was obtained.

EXAMPLE 9

200 g. of a solid free radical polymerized copolymer of 15 parts of butadiene and 85 parts of styrene was dissolved in 800 ml. xylene. The copolymer was oxidized as described as in Example 1 but with an amount of peracetic acid corresponding to a 20% excess over the stoichiometric amount required to fully oxidize the product. The oxidized copolymer was recovered as described in Example 1 and found to contain 2.8% oxirane oxygen.

To a xylene solution of the oxidized butadiene cooplymer was then added maleic acid in an amount corresponding to 0.101 g. per gram of resin. The mixture was then spread on a glass plate and the coated glass plate baked for 2 hours at 130° C. The resin coating obtained after baking was very hard and showed very good adhesion to the glass plate.

EXAMPLE 10

300 g. of a liquid copolymer of approximately 73 parts of butadiene and 27 parts of acrylonitrile were dissolved in 300 g. of toluene. To this solution was slowly added 391 g. of 40% peracetic acid containing 20 g. of sodium acetate and 0.9 g. of dipicolinic acid. This amount of peracetic acid corresponds to a slight excess over the amount theoretically required to oxidize all double bonds in the polymer. The mixture was maintained for about 6 hours at a temperature of about 25 to 30° C. and the oxidized product recovered as described in Example 1. Analysis showed that it contained 4.79% oxirane oxygen.

To a toluene solution of the product was then added an amount of maleic acid corresponding to 0.260 g. per gram of oxidized copolymer in solution. This mixture was then evenly spread on a glass plate and the coated plate baked for 2 hours at 150° C. The resin coating obtained was hard, tough and showed very good adhesion to the glass plate.

EXAMPLE 11

200 g. of a copolymer of 56 parts of styrene, 14 parts of methyl styrene and 30 parts of cyclopentadiene were dissolved in a mixture of 400 ml. of benzene and 400 ml. of chloroform. To this solution was slowly added 239 g. of 40% peracetic acid containing 12 g. of sodium acetate and 0.5 g. of dipicolinic acid. This amount of peracetic acid corresponds to a 20% excess over the amount theoretically required to oxidize all double bonds in the polymer. The mixture was maintained for about 30 minutes at about 25° C. and for an additional 75 minutes at about 30° C. The oxidized product was recovered as described in Example 1 and was found to contain 2.44% oxirane oxygen.

To a benzene solution of the product was then added an amount of maleic acid corresponding to 0.088 g. per gram of oxidized copolymer in solution. The mixture was then evenly spread on a glass plate and the coated plate baked for 2 hours at 150° C. The resin coating obtained after baking was hard and tough.

EXAMPLE 12

200 g. of a copolymer of 15 parts of acrylonitrile, 15 parts of isoprene and 70 parts of styrene were dissolved in 600 ml. of toluene. To this solution was slowly added 124 g. of 40% peracetic acid containing 6 g. of sodium acetate and 0.25 g. of dipicolinic acid. This amount of peracetic acid corresponds to 20% excess over the amount theoretically required to oxidize all double bonds. The mixture was maintained for 2½ hours at about 25 to 30° C. and the oxidized product recovered as described in Example 1. Analysis showed that it contained 2.1% oxirane oxygen.

The product was then dissolved in a mixture of toluene and ethylene glycol monomethyl ether and to this solution was added maleic acid in an amount corresponding to 0.075 g. per gram of oxidized copolymer solution. This mixture was then evenly spread on a glass plate and the coated plate baked for 1 hour at 150° C. A very hard and tough coating showing good adhesion to the glass plate was obtained.

In summary, therefore, the invention comprises first subjecting a copolymer of a diene to an epoxidizing reaction with an epoxidizing reagent, the amount of such reagent being such that at least 10% of the potentially epoxidizable double bonds are epoxidized and subsequently reacting the so oxidized butadiene copolymer with a polybasic acid, the amount of the latter being at least 10% of that required for complete reaction so that a thermosetting resin is formed as an end product.

What is claimed is:

1. A method for the production of thermoset resins which comprises epoxidizing a copolymer of a conjugated diene and an ethylenic monomer containing the $$CH_2=CH-$$

group with an amount of a liquid lower aliphatic peracid corresponding to at least 10% of the amount required to epoxidize all double bonds present in said copolymer contacting the thus oxidized copolymer with about 10% to 200% of a compound selected from the group consisting of dibasic carboxylic acids and their anhydrides, said 10% to 200% being calculated as percent of the theoretical amount of said compound required for reaction with oxirane oxygen in said epoxidized copolymer, and heating the resulting mixture until a thermoset resinous product has been formed.

2. The method of claim 1 in which the aliphatic peracid is peracetic acid.

3. The method of claim 1 in which the aliphatic peracid is performic acid.

4. As a new composition of matter, a thermoset resin produced by the method of claim 1.

5. The step in the production of thermoset resins from an epoxidized copolymer of a conjugated diene and an ethylenic monomer containing the $CH_2=CH-$ group, said epoxidized copolymer having been formed by reaction of the copolymer with a liquid lower aliphatic peracid, which step comprises contacting said epoxidized copolymer with about 10% to 200% of a compound selected from the group consisting of dibasic carboxylic acids and their anhydrides, said 10% to 200% being calculated as percent of the theoretical amount of said compound required for reaction with oxirane oxygen in said epoxidized copolymer, and heating the resulting mixture until a thermoset resinous product has been formed.

6. The step in the production of thermoset resins from an epoxidized copolymer of a conjugated diene and an ethylenic monomer containing the $CH_2=CH-$ group, said epoxidized copolymer having been formed by reaction of the copolymer with peracetic acid, which step comprises contacting said epoxidized copolymer with about 10% to 200% of a compound selected from the group consisting of dibasic carboxylic acids and their anhydrides, said 10% to 200% being calculated as percent of the theoretical amount of said compound required for reaction with oxirane oxygen in said epoxidized copolymer, and heating the resulting mixture until a thermoset resinous product has been formed.

7. The step in the production of thermoset resins from an epoxidized copolymer of a conjugated diene and an ethylenic monomer containing the $CH_2=CH-$ group, said epoxidized copolymer having been formed by reaction of the copolymer with performic acid, which step comprises contacting said epoxidized copolymer with about 10% to 200% of a compound selected from the group consisting of dibasic carboxylic acids and their anhydrides, said 10% to 200% being calculated as percent of the theoretical amount of said compound required for reaction with oxirane oxygen in said epoxidized copolymer, and heating the resulting mixture until a thermoset resinous product has been formed.

8. The step in the production of thermoset resins from an epoxidized copolymer of a conjugated diene and an ethylenic monomer containing the $CH_2=CH-$ group, said epoxidized copolymer having been formed by reaction of the copolymer with a liquid lower aliphatic peracid, which step comprises contacting said epoxidized copolymer with about 10% to 200% of a compound selected from the group consisting of polybasic carboxylic acids and their anhydrides, said 10% to 200% being calculated as percent of the theoretical amount of said compound required for reaction with oxirane oxygen in said epoxidized copolymer, and heating the resulting mixture until a thermoset resinous product has been formed.

9. As a new composition of matter, a thermoset resin produced by the method of claim 8.

References Cited in the file of this patent
UNITED STATES PATENTS 2,660,563     Banes et al.     Nov. 24, 1953

OTHER REFERENCES

Can. J. Chem., vol. 31 (1953), pp. 23–29 (Mageli et al.).

J. A. Oil Chem. Soc., vol. 31 (1954), pp 363–65 (Schmitz et al.).